United States Patent
Gao

(10) Patent No.: US 10,846,309 B2
(45) Date of Patent: Nov. 24, 2020

(54) DATA INDEXING METHOD, DATA QUERYING METHOD AND ELECTRONIC DEVICE

(71) Applicant: MICROFUN Inc., Beijing (CN)

(72) Inventor: Chi Gao, Beijing (CN)

(73) Assignee: MICROFUN Inc., Beijing (CN)

( * ) Notice: Subject to any disclaimer, the term of this patent is extended or adjusted under 35 U.S.C. 154(b) by 25 days.

(21) Appl. No.: 15/823,642

(22) Filed: Nov. 28, 2017

(65) Prior Publication Data

US 2019/0079991 A1    Mar. 14, 2019
US 2020/0210531 A9    Jul. 2, 2020

(30) Foreign Application Priority Data

Sep. 13, 2017   (CN) .......................... 2017 1 0824712

(51) Int. Cl.
*G06F 7/00*        (2006.01)
*G06F 17/30*       (2006.01)
*G06F 16/28*       (2019.01)
*G06F 16/22*       (2019.01)
*G06F 16/2453*     (2019.01)
*G06F 16/13*       (2019.01)

(52) U.S. Cl.
CPC .......... *G06F 16/285* (2019.01); *G06F 16/137* (2019.01); *G06F 16/2246* (2019.01); *G06F 16/2272* (2019.01); *G06F 16/2453* (2019.01)

(58) Field of Classification Search
None
See application file for complete search history.

(56) References Cited

U.S. PATENT DOCUMENTS

2007/0043697 A1*  2/2007  Driesch, Jr. ....... G06F 16/24545
2015/0363167 A1* 12/2015  Kaushik ............... G06F 16/221
                                                                707/753
2016/0092111 A1*  3/2016  Ren ...................... G06F 3/0607
                                                                711/162

* cited by examiner

*Primary Examiner* — Tuan A Pham
(74) *Attorney, Agent, or Firm* — J.C. Patents

(57) ABSTRACT

Provided are a data indexing method, a data querying method and an electronic device. The data indexing method includes: creating a clustered index for a plurality of data records according to values of preset fields within the plurality of data records, wherein the plurality of data records are configured to store data files, and the values of the preset fields are field values of the clustered index; plotting, for each of the data records, a data distribution diagram of offsets versus the data records in the data file; and performing curve-fitting on the data distribution diagram to obtain an index relation containing correspondences between the field values and the offsets, so that the offset is calculated according to the field values of the data record to be queried, and thereby the data record is queried.

7 Claims, 5 Drawing Sheets

Acquiring field values of preset fields of at least one data record to be queried — S201

Calculating positional offset(s) for the data record to be queried in the data file according to the field values and a preset fitting function — S202

Performing curve-fitting on the distribution of the positional offsets corresponding to the respective field values to obtain a fitting function — S203

DATA INDEXING METHOD, DATA QUERYING METHOD AND ELECTRONIC DEVICE

The present application claims the priority to the Chinese patent application with the filing No. CN201710824712.9, filed with the State Intellectual Property Office on Sep. 13, 2017, entitled "Data Indexing Method, Data Querying Method and Electronic Device", contents of which are incorporated herein by reference in its entirety.

TECHNICAL FIELD

The present invention relates to the technical field of big data indexing, and particularly to a data indexing method, a data querying method and an electronic device.

BACKGROUND ART

Hadoop is a software framework capable of conducting distributed processing on massive data (for example, files of GBs or TBs), and allows storing and processing of big data in an entire cluster using a distributed environment of simple programming model computers. It is intended to extend from a single server to thousands of machines, where each machine may provide local computing and storage.

Currently known data indexes for supporting big data include multi-level merging tree and B+ tree, etc. Taking B+ tree as an example, there is a minimum limit for the storage resources occupied by the indexed data. Assuming that the in one query, 400 KB of data is scanned on average, for 2 GB of data, there may be about 2000 MB/400 KB=5K index entries. Assuming that the key and the offset both are in a form of a 64-bit integer, an index entry occupies 16 bytes, and indexed data may have a size of 80 KB which occupies more storage resources, resulting in a low efficiency in querying data files by an index.

DISCLOSURE OF THE INVENTION

In view of the above, an object of the present invention is to provide a data indexing method, a data querying method and an electronic device, so as to alleviate the technical problems existing in the prior art that the indexed data occupies more storage resource and the efficiency in querying data files by an index is low.

In a first aspect, an embodiment of the present invention provides a data indexing method which includes steps of:

creating, in order of field values of preset fields within a plurality of data records corresponding to a data file, a clustered index for the data file, with the data records having different positional offsets in the data file;

plotting, for the plurality of data records in the data file, distribution of positional offsets corresponding to the field values; and performing curve-fitting on the distribution of positional offsets corresponding to the respective field values to obtain a fitting function, so as to determine a positional offset according to field value(s) of preset field(s) in a data record to be queried, and then acquire the data record according to the determined positional offset.

In combination with the first aspect, an embodiment of the present invention provides a first possible implementation of the first aspect, where the step of performing curve-fitting on the distribution of the positional offsets corresponding to the respective field values to obtain a fitting function includes steps of:

performing curve-fitting on the distribution of positional offsets corresponding to a plurality of field values to obtain a fitting function;

calculating a positional offset for each data record according to the fitting function; and determining that the fitting function satisfies a preset condition when deviation values are all smaller than a preset threshold, with each deviation value between an actual positional offset and a calculated positional offset corresponding to one of the plurality of data records, and keeping the fitting function.

In combination with the first aspect, an embodiment of the present invention provides a second possible implementation of the first aspect, where the step of performing curve-fitting on the distribution of positional offsets corresponding to the respective field values to obtain a fitting function further includes steps of:

dividing the plurality of field values into two sets of field values if the fitting function fails to satisfy the preset condition;

performing curve-fitting, respectively for the two sets of field values, on distribution of positional offsets corresponding to the plurality of field values, to obtain fitting functions;

performing a further division, when only one fitting function satisfies the preset condition, on a plurality of field values in the set of field values corresponding to the fitting function that fails to satisfy the preset condition into two sets of field values;

performing curve-fitting on combined set of adjacent sets of field values to obtain a fitting function, with one being a set of field values of a fitting function that satisfies the preset condition in the sets of the field values obtained by the further division and the other being the set of field values corresponding to any fitting function satisfying the preset condition; and calculating a positional offset for each data record according to the fitting function, until the obtained fitting function satisfies the preset condition.

In combination with the first aspect, an embodiment of the present invention provides a third possible implementation of the first aspect, where the step of performing curve-fitting on the distribution of positional offsets corresponding to the respective field values to obtain a fitting function further includes steps of:

selecting several field values from the respective remaining field values, in case that there remain multiple field values in the set of field values corresponding to the fitting function that fails to satisfy the preset condition and the fitting function obtained, by performing curve-fitting on the remaining field values and the set of field values corresponding to the fitting function that satisfies the preset condition, fails to satisfy the preset condition, wherein the selected several field values and respective positional offsets corresponding to the field values gradually increase monotonously, and a difference value between any two adjacent positional offsets is a preset threshold; and establishing an index for the selected respective field values and the positional offsets corresponding to the selected field values respectively by an original indexing method.

In combination with the first aspect, an embodiment of the present invention provides a fourth possible implementation of the first aspect, where the step of performing curve-fitting on the distribution of positional offsets corresponding to the respective field values to obtain a fitting function further includes steps of:

determining respective actual positional offsets and field values corresponding to the actual positional offsets if the fitting function fails to satisfy the preset condition;

judging, in the individual determined field values, whether there is a situation that a difference value between any two adjacent field values is greater than a preset jump threshold; and inserting a blank record in the data file, if there is the situation that a difference value between any two adjacent field values that is greater than a preset threshold, with the blank record between the two adjacent field values which have a difference value greater than the preset threshold, so that the actual positional offset corresponding to the larger field value in the two adjacent field values varies, and further so that the positional offsets corresponding to respective field values and the inserted blank record are subjected to fitting to obtain a fitting function, with the fitting function satisfying the preset condition.

In combination with the first aspect, an embodiment of the present invention provides a fifth possible implementation of the first aspect, where the step of performing curve-fitting on the distribution of positional offsets corresponding to the respective field values to obtain a fitting function further includes steps of:

determining, if the fitting function fails to satisfy the preset condition, a data record in which a deviation value between an actual positional offset and a calculated positional offset is greater than the preset threshold; and establishing, for the data record, at the calculated positional offset a jump record indicating a jump to the actual positional offset, so that data record at the actual positional offset is able to be queried according to the jumping record.

In combination with the first aspect, an embodiment of the present invention provides a sixth possible implementation of the first aspect, where the step of performing curve-fitting on the distribution of positional offsets corresponding to the respective field values to obtain a fitting function further includes steps of:

determining, if the fitting function fails to satisfy the preset condition, a plurality of data records each having a deviation value between an actual positional offset and a calculated positional offset greater than a preset threshold; and establishing a jump table including correspondences between the field values and the actual positional offsets of the plurality of data records, so that the data records at the actual positional offsets are able to be queried according to the jumping table.

In combination with the first aspect, an embodiment of the present invention provides a seventh possible implementation of the first aspect, where the step of performing curve-fitting on the distribution of positional offsets corresponding to the respective field values to obtain a fitting function further includes steps of:

selecting a first preset number of field values from a plurality of field values and performing curve-fitting to obtain a fitting function, wherein every two adjacent field values are spaced by a second preset number of field values.

In a second aspect, an embodiment of the present invention further provides a data querying method which includes steps of:

acquiring field value(s) of preset field(s) of at least one data record to be queried;

calculating, according to the field value(s) and a preset fitting function, positional offsets for the data record to be queried in a data file, the fitting function being determined according to the positional offsets corresponding to the respective field values; and querying the data record to be queried in the data file according to the positional offset(s).

In combination with the second aspect, an embodiment of the present invention provides a first possible implementation of the second aspect, where the step of querying the data record to be queried in a data file according to the positional offset(s) includes steps of:

determining an offset range based on the positional offsets and a preset threshold; and querying data record(s) in the offset range.

In combination with the second aspect, an embodiment of the present invention provides a second possible implementation of the second aspect, where if a plurality of data records are to be queried, and the field values and the positional offsets of the plurality of data records to be queried gradually increase monotonously, the method further includes steps of:

obtaining a maximum upper bound field value for the plurality of data records to be queried, and a minimum lower bound field value for the plurality of data records to be queried;

calculating a lower bound positional offset and an upper bound positional offset respectively using the fitting function, the upper bound field value and the bound lower field value;

calculating a reference field value based on the fitting function and the lower bound positional offset;

determining, if the reference field value is greater than the lower bound field value, a candidate field value which is smaller than the lower bound field value and adjacent to the lower bound field value, and a candidate positional offset corresponding to the candidate field value; and performing querying between the candidate positional offset and the upper bound positional offset to obtain a plurality of data records to be queried.

In a third aspect, an embodiment of the present invention further provides a data indexing apparatus which includes a creation module, a plotting module and a fitting module.

The creation module is configured to create, in order of field values of preset fields within a plurality of data records corresponding to a data file, a clustered index for the data file, with the data records having different positional offsets in the data file.

The plotting module is configured to plot, for the plurality of data records in the data file, distribution of positional offsets corresponding to the field values.

The fitting module is configured to perform curve-fitting on the distribution of positional offsets corresponding to the respective field values to obtain a fitting function, so as to determine a positional offset according to field value(s) of preset field(s) in a data record to be queried, and then acquire the data record according to the determined positional offset.

In a fourth aspect, an embodiment of the present invention further provides a data querying apparatus which includes an acquisition module, a calculation module and a query module.

The acquisition module is configured to acquire field values of preset fields of at least one data record to be queried.

The calculation module is configured to calculate, according to the field values and a preset fitting function, a positional offset for the data record to be queried in the data file, the fitting function being determined according to the positional offsets corresponding to the respective field values.

The query module is configured to query the data record to be queried in the data file according to the positional offset.

In a fifth aspect, an embodiment of the present invention further provides an electronic device including a memory and a processor, wherein the memory stores computer programs operable on the processor, and the processor executes the steps of the method according to the first aspect or the second aspect in executing the computer programs.

In a sixth aspect, an embodiment of the present invention further provides a computer readable medium having non-volatile program codes executable by a processor, wherein the program codes are used to make the processor execute the method according to the first aspect or the second aspect.

The embodiments of the present invention provide the following beneficial effects. In the embodiments of the present invention, a data record is queried by creating a clustered index for a plurality of data records according to values of preset fields within the plurality of data records, where the plurality of data records are used for storing data files, and the values of the preset fields are field value of the clustered index; and then, plotting, for each of the data records, a data distribution diagram of offset versus field value of data records in the data file, and performing curve-fitting on the data distribution diagram to obtain an index relation containing the correspondences between the field values and the offsets, so that the offset is calculated according to the field values of the data record to be queried.

At least one data record is obtained by first acquiring a field value of the at least one data record to be queried, then calculating, if the field value is within a preset range, an offset of the data record to be queried in the data file based on the field value and a preset indexing relation, and querying the offset in the data file.

The embodiments of the invention may achieve that data amount of indexed data is reduced, storage resource is saved, all the indexed data can be loaded to a disk conveniently, and a data record can be found through locating only once when querying.

Other features and advantages of the present invention will be set forth in the description that follows, and will be in part apparent from the description, or may be learned by practice of the invention. The objects and other advantages of the present invention are realized and obtained by the structure particularly pointed out in the description, the claims and the figures.

To make the above objects, features and advantages of the present invention more apparent and understandable, by way of preferred embodiments in conjunction with the accompanying drawings, detailed description is given as follows.

BRIEF DESCRIPTION OF DRAWINGS

In order to explain the technical solutions of the specific embodiments of the present invention or of the prior art more clearly, drawings required for use in the description of specific embodiments or the prior art will be introduced briefly below. It will be obvious that the drawings described below are merely some embodiments of the present invention, and those skilled in the art can also obtain, from these drawings, other drawings without inventive efforts.

DETAILED DESCRIPTION OF EMBODIMENTS

To make the objects, the technical solutions and the advantages of the embodiments of the present invention more clear, the technical solutions of the present invention will be described below clearly and fully with reference to the figures. It is apparent that the embodiments to be described are some, but not all of the embodiments of the present invention. All the other embodiments obtained by those skilled in the art from the embodiments of the present invention without inventive efforts will fall within the scope of the present invention as claimed.

Currently known data indexes for supporting big data include multi-level merging tree and B+ tree, etc. However, there will be 80 KB of indexed data for those data indexes, which occupies many storage resources, resulting in a low efficiency in querying data file according to the indexes. In view of the above, the embodiments of the present invention provide a data indexing method, a data querying method and an electronic device, which are able to reduce data amount of indexed data, save storage resources, conveniently load all the indexed data to a disk, and search a data record by locating only once when querying.

Figure 1:
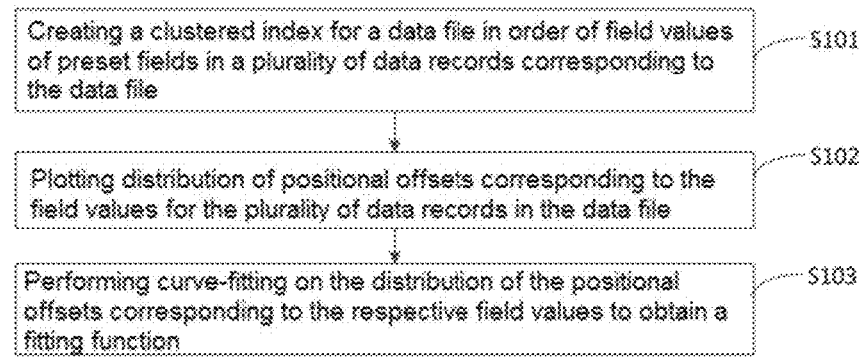
FIG. 1 is a flow chart of a data indexing method provided by an embodiment of the present invention.

In order to facilitate understanding of the present embodiment, the data indexing method disclosed in an embodiment of the present invention is firstly described in detail. The data indexing method is applicable to devices such as computers, servers and the like. As shown in FIG. 1, the data indexing method may include the following steps.

Step S101. A clustered index for a data file is created in order of field values of preset fields in a plurality of data records corresponding to the data file.

In the embodiments of the present invention, the data file may refer to big data, for example, a giant data file stored in Hadoop, e.g., files of GBs or TBs. It is assumed that the data file includes three preset fields which are user ID, registration time and country, respectively. The plurality of data records are ranked according to the user ID after a clustered index for the plurality of data records is created in order of user IDs, as shown in Table 1 below, in which each row shows one data record.

TABLE 1

| User ID | Registration time | Country |
|---|---|---|
| 1 | 2017-01-01 00:00:00 | CN |
| 2 | 2017-01-01 00:00:00 | CN |
| 3 | 2017-01-01 00:00:00 | CN |

In an embodiment of the present invention, the data records each have a different positional offset in the data file. As shown in Table 2, assuming that each data record have a length of 25 KB, the corresponding positional offsets may be 0, 25, 50, and the like, respectively.

TABLE 2

| Field Value | Positional offset | Data Record | Length of Data Record |
|---|---|---|---|
| 1 | 0 | 1,2017-01-01 00:00:00,CN | 25 |
| 2 | 25 | 2,2017-05-01 00:00:00,CN | 25 |
| 3 | 50 | 3,2017-07-01 00:00:00,CN | 25 |

Step S102. Distribution of positional offsets corresponding to the field values are plotted for the plurality of data records in the data file.

In this step, the distribution of the positional offsets corresponding to the field values may be plotted for each data record in a coordinate system which takes the field value as the X axis and the positional offset as the Y axis. In the plotted distribution of the positional offsets corresponding to the field values, each sample point corresponds to one data record.

Step S103. The distribution of positional offsets corresponding to the respective field values are subjected to curve-fitting to obtain a fitting function.

In this step, tools like matlab may be used to perform curve-fitting on the distribution of the positional offsets corresponding to the respective field values to obtain the fitting function. For example, the fitting function may be in the form of y=ax+b, etc. In practical applications, the fitting function may be a multivariate polynomial equation, and the fitting function is not to be defined in the embodiments of the present invention and may vary with situations.

By Step S103, it is easy to determine a positional offset according to the field value of the preset field in a data record to be queried, and thereby acquire the data record according to the determined positional offset.

In an embodiment of the present invention, firstly a clustered index for a data file is created in order of field values of preset fields in a plurality of data records corresponding to the data file, where the data records each have a different positional offset in the data file Then the distribution of positional offsets corresponding to the field values are plotted for the plurality of data records in the data file. At last, the distribution of the positional offsets corresponding to the respective field values are subjected to curve-fitting to obtain a fitting function, facilitating determination of a positional offset according to the field value of the preset field in a data record to be queried and acquisition of the data record according to the determined positional offset.

In the embodiments of the invention, the field values and the positional offsets are used as the index entries for data files. The indexed data amount is small and thus is easy to be fully loaded to a disk. And in actual querying, a positional offset may be obtained according to only the field value and the fitting function, and thereby the data record stored at the positional offset in the data file may be located in one attempt.

For example, if our intention is to scan 400 KB of data on average in one query, for 2 GB of data, there may be about 2000 MB/400 KB=5K index entries. Assuming that the field value and the positional offset both are in a form of a 64-bit integer, an index entry will occupy 16 bytes and the indexed data will have a size of 80 KB. In actual productions, the algorithm of the present invention (interval fitting is not realized) generates an index file of about 15 KB.

On the basis of the foregoing embodiment, in another embodiment of the present invention, Step S103 may include the following steps.

1) The distribution of positional offsets corresponding to a plurality of field values are subjected to curve-fitting to obtain a fitting function.

2) The positional offsets for the respective data records are calculated by the fitting function.

In order to verify whether the respective data records in the data file are distributed very evenly, a plurality of field values may be used in the fitting function, respectively, to obtain the positional offsets for the respective data record.

3) It is determined that the fitting function satisfies a preset condition if deviation values between actual positional offsets and the calculated positional offsets corresponding to the plurality of data records are all smaller than a preset threshold, and the fitting function is kept.

If the deviation values between the respective calculated positional offsets and the actual positional offsets of the data records are all smaller than the preset threshold (for example, 200 KB), it means that the data records in the data file are distributed very evenly, that is, i the fitting function is considered accurate if errors of the respective calculated positional offsets relative to the actual positional offsets are smaller than the preset threshold, and in this case the fitting function may be kept.

Figure 2:
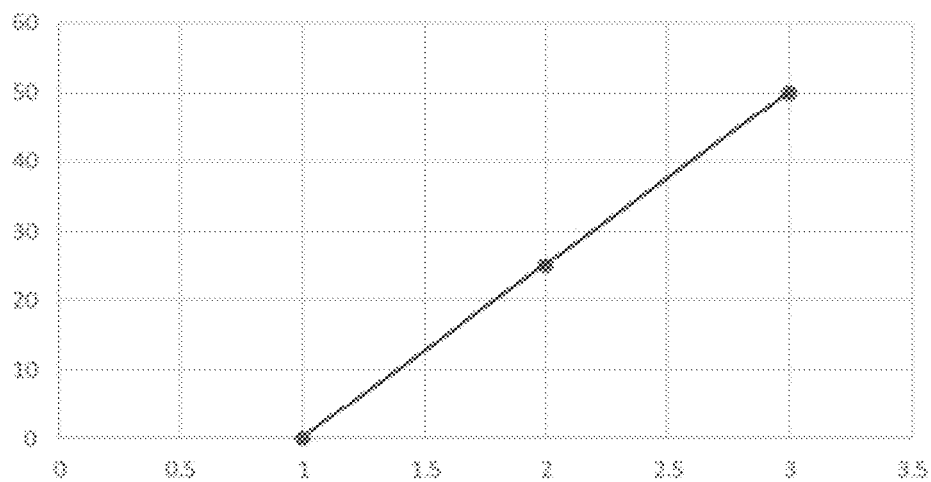
FIG. 2 is a fitting curve provided by an embodiment of the present invention.

For example, the distribution of the positional offsets corresponding to the respective field values in Table 2 can be seen in FIG. 2. Then the distribution of the positional offsets corresponding to the respective field value is subjected to curve-fitting. Since the data is distributed very evenly, the fitted curve may be a straight line in the form of y=ax+b, where the coefficient a=25 and b=−25. Therefore, when needing to query location of a data record with user ID=2 is in the data file, x may be substituted with 2 in the fitting function, yielding the positional offset y=f(2)=25×2−25=25, that is, the data record with the user ID=2 can be found at a positional offsetting by 25 bytes in the file.

For another example, the field value in Table 3 goes directly from 1 and 2 to 5, indicating very uneven distribution.

TABLE 3

| Field Value | Positional offset | Data Record | Length of the Data Record |
|---|---|---|---|
| 1 | 0 | 1,2017-01-01 00:00:00,CN | 25 |
| 2 | 25 | 2,2017-05-01 00:00:00,CN | 25 |
| 5 | 50 | 3,2017-07-01 00:00:00,CN | 25 |

Figure 3:
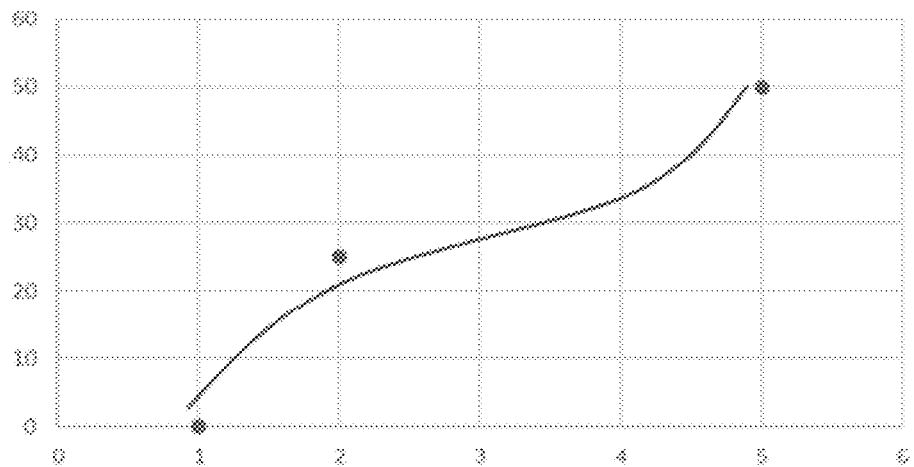
FIG. 3 is a fitting curve provided by another embodiment of the present invention.

The distribution of positional offsets corresponding to the respective field values in Table 3 can be seen in FIG. 3. Then the distribution of positional offsets corresponding to the respective field values are subjected to curve-fitting. Due to a less even data distribution, the fitted curve may be a curve, and the fitted curve does not necessarily pass right through the sample points. In practical applications, there are many curve forms for fitting, and B-spline is used herein. B-spline per se has different orders, just like an N-variate polynomial where polynomials of different variates have different numbers of coefficients. A 3-order B-spline with 24 coefficients is used herein, so the fitted curve will have 24 floating points, and the curve in FIG. 3 may be obtained by using the 24 floating points as the coefficient of the fitting function, and thereby Y may be calculated based on X. Furthermore, the number of coefficients of the curve is not directly correlated to the number of sample points.

On the basis of the foregoing embodiment, in another embodiment of the present invention, Step S103 may further include the following steps.

1) The plurality of field values are divided into two sets of field values if the fitting function fails to satisfy the preset condition, as shown in Table 4.

TABLE 4

| | | | | X | | | |
|---|---|---|---|---|---|---|---|
| | 1 | 2 | 5 | 9 | 100 | 102 | 104 |
| Y | 0 | 25 | 50 | 75 | 85 | 95 | 105 |

Figure 4:
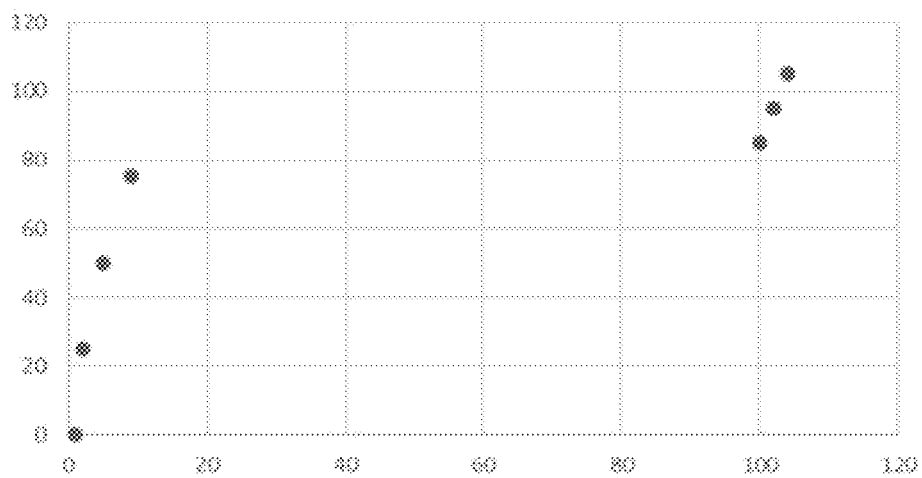
FIG. 4 is a fitting curve provided by yet another embodiment of the present invention.
Figure 5:
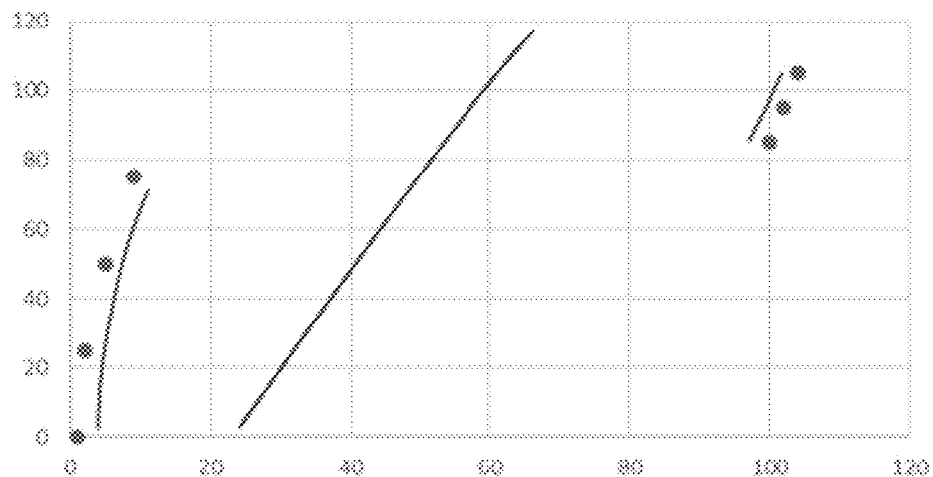
FIG. 5 is a fitting curve provided by still another embodiment of the present invention.

The distribution of the positional offsets corresponding to the respective field value in Table 4 can be seen in FIG. 4. There is a big jump among the sample points in FIG. 4. If the seven sample points are directly fitted into a curve, a case shown by the segments between 20 and 80 on the horizontal axis in FIG. 5 occurs. In this case, the fitting function fails to satisfy the preset condition, that is, the deviation values between the actual positional offsets and the calculated positional offsets corresponding to the plurality of data records are greater than or equal to the preset threshold. That is, in practice, the data records may be distributed less evenly, and the error of each calculated positional offset with respect to the actual positional offset would be greater than or equal to the preset threshold.

In this case, this problem may be solved by fitting two independent curves, i.e., dividing the user IDs into two sets of field values, i.e., user IDs from 0 to 20 and user IDs from 20 to 120.

2) For each set of the field values, the distribution of positional offsets corresponding to the plurality of field values is subjected to curve-fitting to obtain a fitting function.

In the case that the obtained two fitting functions both satisfy the preset condition, the positional offset may be calculated by using a first fitting curve for the user IDs from 0 to 20, and the positional offset may be calculated by using a second fitting curve for the user IDs from 8 to 120.

3) In the case that only one fitting function satisfies the preset condition, the plurality of field values in the set of field values corresponding to the fitting function which fails to satisfy the preset condition are further divided into two sets of field values.

However, in order to ensure an accurate calculation of a positional offset by the obtained fitting function, it is required to verify the fitting functions obtained by fitting each set of field value, that is, to check whether the fitting functions satisfy the preset condition. For the fitting function which fails to satisfy the preset condition, the set of field values from which the fitting function is obtained needs to be further divided into two sets of field values.

4) Curve-fitting is performed on combined set of adjacent sets of field values to obtain a fitting function, with one being a set of field values of a fitting function that satisfies the preset condition in the sets of the field values obtained by the further division and the other being the set of field values corresponding to any fitting function satisfying the preset condition.

5) By the fitting function, the positional offsets of the respective data records are calculated until the obtained fitting function satisfies the preset condition.

For example, assuming that the first three points in FIG. 4 are fitted, the fitting is successful and the deviation value is less than the preset threshold, and the algorithm does not ends here, but attempts to fit some more points. Since the fitting function obtained by fitting all 7 points fails to satisfy the preset condition, which means that the fitting is not successful, and the fitting function obtained by fitting three points satisfies the preset condition, which means that the fitting is successful, one may attempt to fit 3+(7−3)/2=5 points. Assuming the fitting fails, and considering that fitting of all 5 points fails and fitting of 3 points is successful, one may attempt to fit 3+(5−3)/2=4 points. Assuming that the fitting is successful, and considering that fitting of all 5 points fails and fitting of 4 points is successful, the number of sampling points to be fitted is four as a maximum, and thus, in the end, the four points may be fitted into a curve. Then the remaining sampling points are fitted using the same algorithm.

In addition, since a large amount of computation would be required if too many points are fitted in one time, and the amount of computation increases exponentially along with the increase of the sample points, it is not possible to fit too many points in one time. By the current setting, a maximum of one hundred thousand points can be fitted in one time. If there are two hundred thousand points in the file, they are fitted into at least two curves. Otherwise, it is quite time-consuming to fit two hundred thousand points in one time.

On the basis of the foregoing embodiment, in another embodiment of the present invention, Step S103 further includes the following steps.

1) In the event that there are still a number of field values remaining in the set of field values corresponding to the fitting function which fails to satisfy the preset condition, and the fitting function obtained by performing curve-fitting on the remaining field values and the fitting function satisfying the preset condition fails to satisfy the preset condition, several field values are selected from the remaining field values, where the selected several field values and the respective positional offsets corresponding to the field values gradually increase incrementally, and the difference value between any two adjacent positional offsets is the preset threshold.

2) An index is established for the selected field values and their corresponding positional offsets by an original indexing method.

In an embodiment of the present invention, if there are only a small number of sample points in the set of field values for which a fitting curve cannot be fitted successfully, an index may be established for those sample points by just using the original indexing method (the B+ tree indexing method), so that more system resources may be saved.

Since 24 floating point numbers are required for storage of a curve, if the curve covers only two sample points, it would be better to record the two points directly in the space storing the 24 floating point numbers. Since the field value(s) and the positional offset(s) need to be recorded for each sample point, only 4 floating point numbers are required for recording of two sample points. Thus, with respect to the manner of storing the curve, a space for 20 floating point numbers will remain. In practical applications, for making the storage spaces corresponding to respective fitted curve to have identical sizes, the space for the remaining 20 floating point numbers may be filled with filling values, like zero.

In an embodiment of the present invention, it is not necessary to record all the sample points individually in order to locate each sampling point without a deviation, and for the majority of the sample points, it is necessary to perform curve-fitting on the positional offsets, and then scan the data record in a range of a preset threshold (200 KB) according to the positional offsets. Therefore, the remaining respective sampling points are recorded in a jumping manner, that is, after one sampling point is recorded, the next point to be recorded is a sampling point located after 200 KB. In this case, when needing to query a positional offset corresponding to a user ID=X, it is sufficient if two adjacent record values (X1,Y1) and (X2,Y2) are found, where X1<X<X2, and Y must be between Y1 and Y2. Because the data records are ranked in order and the sample points are for sure gradually increasing monotonously, it would be sufficient to scan a region of 200 KB between Y1 and Y2.

In another embodiment in the present invention, Step S103 further includes the following steps.

1) If the fitting function does not satisfy the preset condition, the actual positional offsets and their corresponding field values are determined.

2) In the determined field values, it is checked whether there is a situation that a difference value between any two adjacent field values is greater than a preset jumping threshold.

3) If there is the situation that a difference value between any two adjacent field values is greater than a present threshold, a blank record is inserted between the two adjacent field values which have a difference value greater than the threshold in the data file, so as to make the actual positional offset corresponding to the larger field value in the two adjacent field values vary, and thereby obtain a fitting function by fitting the positional offsets corresponding to the respective field values and the inserted blank record, with the fitting function satisfying the preset condition.

Figure 6:
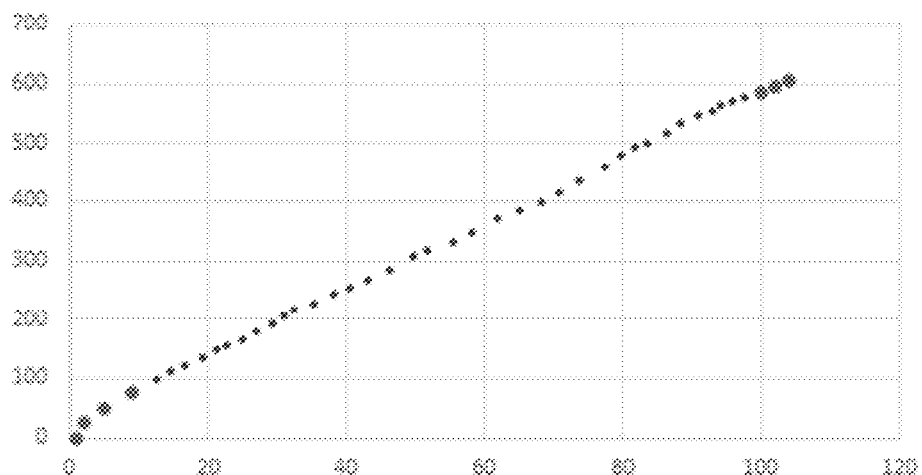
FIG. 6 is a fitting curve provided by still another embodiment of the present invention.

For the case shown in FIG. 4, the blank records lacked may be inserted between X=9~100. Once blank records are inserted, the positional offsets of the three data records for X>=100 in the file become larger (because the inserted blank records will also occupy the storage space), and a case shown in FIG. 6 occurs. The fitting function obtained by curve-fitting in this case will satisfy the preset condition. In querying a data record, if a blank record is found, it may be determined, by the tag of the blank record, that the blank record is not a real data record corresponding to the data file.

In another embodiment of the present invention, Step S101 further includes the following steps.

1) In the case that the fitting function fails to satisfy the preset condition, a data record, in which deviation value between the actual positional offset and the calculated positional offset is greater than the preset threshold, is determined.

2) A jumping record indicating a jump to the actual positional offset is established for the data record at the calculated positional offset, so that the data record at the actual positional offset is able to be queried according to the jumping record.

Figure 7:
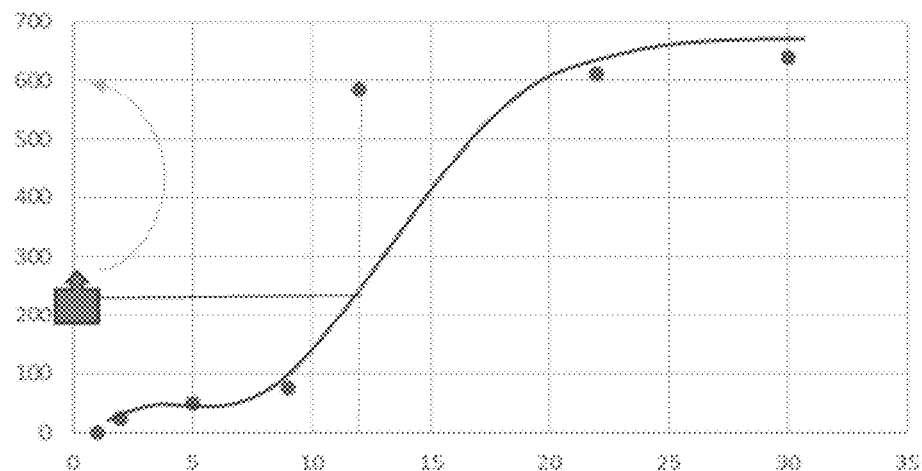
FIG. 7 is a fitting curve provided by still another embodiment of the present invention.

As shown in FIG. 7, assuming that at the vicinity of the field value X=10, there is a big jump for the positional offset for the data record (assuming that the data record of X=9 is very long), if curve-fitting is conducted normally in this case, a positional offset Y=210 is predicted when the positional offset for the data record of X=12 is queried, but actually the record of X=12 is located at Y=585. In this case, in an embodiment of the present invention, a special jumping record reading "if you are searching for the record of X=12, it is at 585" may be placed at the file offset 210, and this jumping record may be embedded into the data record of X=9. Therefore, in actual applications, it is required that the formats of files are able to be supportive of the operation where the middle jumping records are skipped automatically when the data record of X=9 is read.

In the case that there are a lot of jumping records, the data file per se is like a Hash table in which a jumping record is a hash slot and the hash function is a curve.

In another embodiment of the present invention, Step S101 further includes the following steps.

1) In the case that the fitting function fails to satisfy the present condition, a plurality of data records, in which deviation values between the actual positional offsets and the calculated positional offsets are greater than the preset threshold, are determined.

2) A jumping table containing the correspondences between the field values and the actual positional offsets for the plurality of data record is established, so that the data records at the actual positional offsets are able to be queried according to the jumping table.

Figure 8:
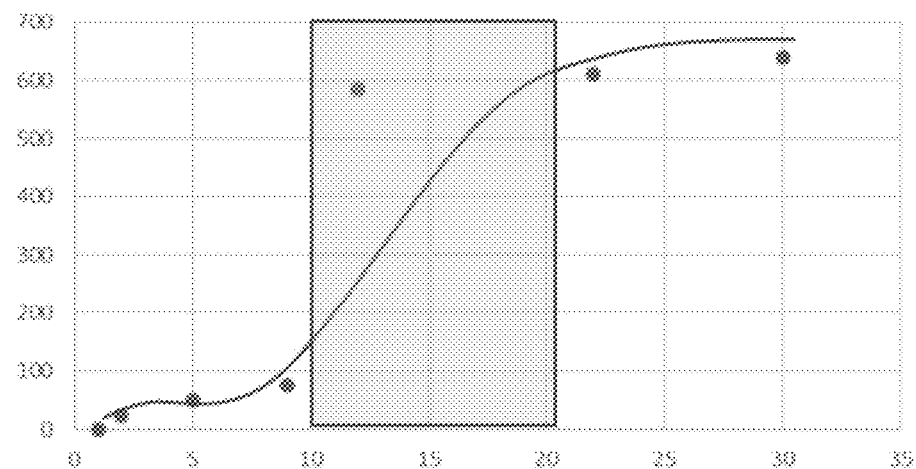
FIG. 8 is a fitting curve provided by still another embodiment of the present invention.

As shown in FIG. 8, assuming that the plurality of data records corresponding to the whole data file are fitted into a curve, but there are several data records whose deviation values between the actual positional offsets and the calculated positional offsets are greater than the preset threshold, a message reading "Do not use the curve in the yellow X section, but use instead the following table "X=12=>Y=585; X=13=>Y=585; X=13=>Y=585 . . . X=20=>Y=585" is required to be stored in the data record of X=9.

In another embodiment of the present invention, Step S103 may include the following steps.

A first preset number of field values are selected from a plurality of field values, and are subjected to curve-fitting to obtain a fitting function, wherein every two adjacent field values are spaced by a second preset number of field values.

With the embodiment of the present invention, two hundred thousands of sampling points may be fitted into a curve by taking one point every other sampling point, which results in one hundred thousands of sampling points. After the curve is fitted, it is sufficient as long as it is verified that in this curve, none of the deviations for all the two hundred thousands of sampling points exceeds 200 KB, which may be not necessarily successful, and which might be successful. Similarly, if there are one million sampling points, the point may be taken every 10 points, and if it fails, one may try to fit half of the file, i.e., five hundred thousands of sampling points, except that the point is taken every 5 sampling points. The field value division method is similar to the foregoing method.

Figure 9:
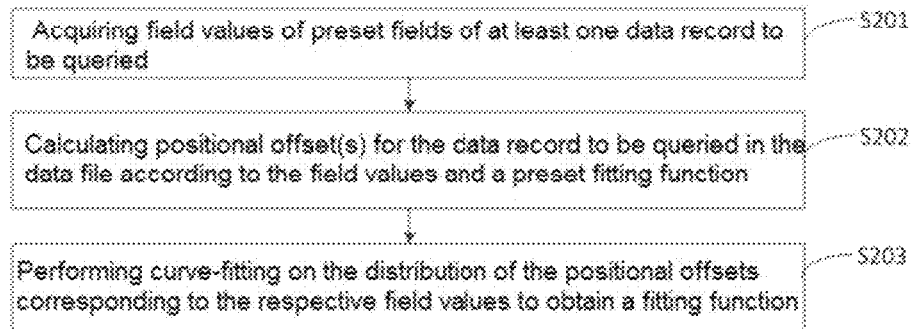
FIG. 9 is a flow chart of a data querying method provided by an embodiment of the present invention.

Based on the foregoing embodiment, in another embodiment of the present invention, a data querying method is further provided. As shown in FIG. 9, the method may include the following steps.

Step S201. Field values of preset fields of at least one data record to be queried are acquired.

Step S202. Positional offset(s) for the data record to be queried in the data file is calculated according to the field values and a preset fitting function, where the fitting function is determined according to the distribution of positional offsets corresponding to the respective field values.

Step S203. Curve-fitting is performed on the distribution of the positional offsets corresponding to the respective field values, to obtain a fitting function.

In this step, an offset range may be determined based on the positional offsets and the preset thresholds, and then data record is queried within the range of the offset.

Figure 10:
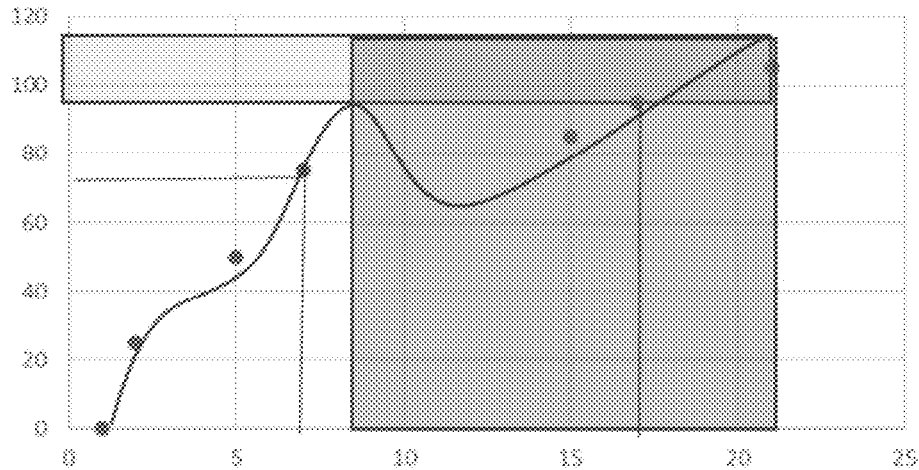
FIG. 10 is a fitting curve provided by another embodiment of the present invention.

As to the case where an original indexing method (B+ tree indexing) is used in the foregoing embodiment, it can be determined that if $X1<X<X2$, $Y1<Y<Y2$, because the sampling points, for sure, gradually increase monotonously. In other words, the broken line obtained by connecting all these sampling points ascends monotonously. However, for a fitted curve, unlike a broken line which may change infinitely fast, a curve cannot change too abruptly, and the changing rate of the curve is limited, and more coefficients need to be adjusted if abrupt changing is desired, but a fitting degree on a large scale cannot be conserved if coefficients are adjusted. Therefore, in some cases, the curve in certain regions descends progressively, as shown in FIG. 10.

It is fine if only X for those sampling points is queried, because before the curve is issued, it has been verified that the deviation for any sampling point does not exceed a preset threshold (200 KB). However, if X is not a given point, that is, X is not present in the file, it may be right in the region which descends progressively, and it may be predicted to have an error offset. Of course, since this X (userID) is not present in the file in the first place, X would not be found even if the surrounding 200 KB is scanned, and the result will be correct. However, if Y for the X is calculated for querying a segment rather than querying a fixed point X, a problem occurs. For example, all records among X1~X2 are queried. In view of this, in another embodiment of the invention, in the case that there are a plurality of data records to be queried, and the field values and the actual positional offsets for the plurality of data records to be queried gradually increase monotonously, the method may include the following steps.

1) The maximum upper bound field value for the plurality of data records to be queried, and the minimum lower bound field value for the plurality of data records to be queried are obtained.

2) The lower bound positional offset and the upper bound positional offset are calculated receptively by using the fitting function, the upper bound field value and the lower bound field value.

3) A reference field value is calculated by the fitting function and the lower bound positional offset.

4) In the case that the reference field value is greater than the lower bound field value, a candidate field value smaller than the lower bound field value and adjacent to the lower bound field value and a reference positional offset corresponding to the candidate field value are determined.

5) A plurality of data records to be queried are obtained by querying between the candidate offset and the upper bound positional offset.

In an embodiment of the present invention, as shown in FIG. 10, it is assumed that sample points in the region of about $7<=X<=21$ need to be queried. If the values for f(7) and f(21) are calculated, in the corresponding Y region, a sample point (X=15, Y=90) would be missed if the scan is conducted in this case.

Therefore, the solution is to read the predicted sample point value f(17) on the lower bound of the Y section (yellow region). It may be seen that the corresponding X=17 is greater than the lower bound of the X section that we intend to search (17>7). However, it is well known to those skilled in the art that for a monotonously ascending curve, the value for X of a sample point at the lower bound in the Y section should be smaller than the lower bound of the X section to be queried.

Once the above case is identified, it is necessary to jump forward by at least one data record (such as 200 KB) and repeat the jumping until the read value for X is smaller than the lower bound of the X section, for example, X is moved left from 17 to 7. Although by this method writing performance may be wasted, it occurs rarely, and the occasional waste of performance may be neglected. In another aspect, for scanning, the process of jumping forward is actually equivalent to the process of scanning the various data records. Once the position where X=7 is scanned, it is not necessary to scan towards the right from X=7 again.

Figure 11:
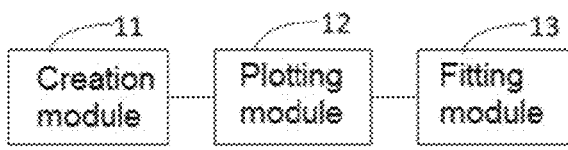
FIG. 11 is a structural diagram of a data indexing apparatus provided by an embodiment of the present invention.

In another embodiment of the present invention, as shown in FIG. 11, there is also provided a data indexing apparatus. Those skilled in the art would appreciate clearly that for the sake of brief and concise description, as to the specific operating procedures of the system and apparatus described above, reference may be made to the corresponding procedures of the methods described in the foregoing embodiments, which will not be repeated herein.

The apparatus includes a creation module 11, a plotting module 12 and a fitting module 13.

The creation module 11 is configured to create, in order of field values of preset fields within a plurality of data records corresponding to a data file, a clustered index for the data file, with the data records having different positional offsets in the data file.

The plotting module 12 is configured to plot, for the plurality of data records in the data file, distribution of positional offsets corresponding to the field values.

The fitting module 13 is configured to perform curve-fitting on the distribution of the positional offsets corresponding to the respective field values to obtain a fitting function, so as to determine a positional offset according to field value(s) of preset field(s) in a data record to be queried, and then acquire a data record according to the determined positional offset.

The apparatus provided in the embodiment of the present invention has the same implementation principle and technical effect as those of the methods described in the embodiments above. For the sake of brief description, for those not mentioned in the apparatus embodiment, reference may be made to the corresponding contents of the methods described in the embodiments above.

Figure 12:
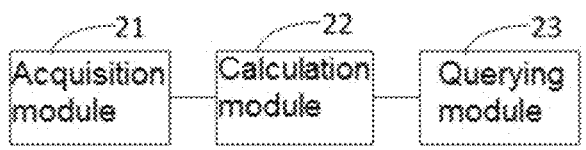
FIG. 12 is a structural diagram of a data querying apparatus according to an embodiment of the present invention.

In another embodiment of the present invention, as shown in FIG. 12, there is also provided a data querying apparatus. Those skilled in the art would appreciate clearly that for the sake of brief and concise description, as to the specific operating procedures of the system and apparatus described above, reference may be made to the corresponding procedures of the methods described in the foregoing embodiments, which will not be repeated herein. The apparatus may include an acquisition module 21, a calculation module 22, and a querying module 23.

The acquisition module 21 is configured to acquire field values of preset fields of at least one data record to be queried.

The calculation module 22 is configured to calculate, according to the field values and a preset fitting function, a positional offset for the data record to be queried in the data file, the fitting function being determined according to the positional offsets corresponding to the respective field values.

The querying module 23 is configured to query the data record to be queried in the data file according to the positional offset.

The apparatus provided in the embodiment of the present invention has the same implementation principle and technical effect as those of the methods described in the embodiments above. For the sake of brief description, for those not mentioned in the apparatus embodiment, reference may be made to the corresponding contents of the methods described in the embodiments above.

In another embodiment of the present invention, there is also provided an electronic device including a memory and a processor, wherein the memory stores computer programs operable on the processor, and the processor executes the steps of the methods according to the method embodiments described above in executing the computer programs.

In another embodiment of the present invention, there is also provided a computer-readable medium having nonvolatile program codes executable by a processor, where the program codes are used to make the processor execute the methods according to the method embodiments described above.

The flowcharts and block diagrams in the drawings show the system, the method, and the architectures, functions, and operations that may be implemented by the computer program product, according to various embodiments of the present invention. In this regard, each of the blocks in the flowcharts or block diagrams may represent a part of a module, a program segment or a code, and a part of the module, the program segment or the code includes one or more executable instructions for implementing specified logic functions. It should also be noted that in some alternative implementations, the functions indicated in the blocks may also occur in an order different from that denoted in the figures. For example, two consecutive blocks can actually be executed substantially in parallel, and they may sometimes be executed in the reverse order, depending on the functions involved. It is also to be noted that each block in the block diagrams and/or flowcharts, as well as the combinations of the blocks in the block diagrams and/or flowcharts, may be implemented by a dedicated hardware-based system that performs the specified functions or actions, or can be implemented by a combination of dedicated hardware and computer instructions.

The computer program product for the data indexing method, the data querying method, and the electronic device provided by the embodiment of the present invention includes a computer readable storage medium which stores program codes, and the instructions included in the program codes may be used to execute the methods described in the preceding method embodiments. For the detailed implementation, reference may be made to the method embodiments, which will not be repeated herein.

It will be clearly appreciated by those skilled in the art that, for the sake of brief and concise description, for specific operating procedures of the system and apparatus described above, reference may be made to the corresponding procedures in the foregoing method embodiments, which will not be repeated herein.

In addition, in the description of the present invention, it should be indicated that unless otherwise expressly specified or defined, terms like "mount", "couple", and "connect" should be understood broadly, and for example, a connection may be a fixed connection, or a detachable connection, or an integrated connection, may be a mechanical connection or an electric connection, or may be a direct connection, or an indirect connection via an intermediate medium, or may be an internal communication between two elements. The specific meanings of the above-mentioned terms in the present invention could be understood by those skilled in the art according to specific situations.

When being implemented in the form of a software functional unit and sold or used as a stand-alone product, the functions may be stored in a computer-readable storage medium. Based on such understanding, the technical solution of the present invention in essence, or the part thereof that contributes to the prior art, or parts of the technical solution may be embodied in the form of a software product. The computer software product is stored in a storage medium, which includes several commands for enabling a computer device (which may be a personal computer, a server, a network device or the like) to execute all or part of the steps of the method described in each embodiment of the present invention. The aforesaid storage medium includes a USB flash disk, a mobile hard disk, a read-only memory (ROM), a random access memory (RAM), a magnetic disk or an optical disk or various media capable of storing program codes.

In the description of the present invention, it should be indicated that orientation or positional relations indicated by terms such as "center", "up", "down", "left", "right", "vertical", "horizontal", "inside", and "outside" are the orientation or positional relations shown based on the figures, only for facilitating description of the present invention and simplifying the description, rather than indicating or implying that the referred devices or elements must be in a particular orientation or constructed or operated in the particular orientation, and therefore they should not be construed as limiting the present invention. In addition, terms such as "first", "second", and "third" are used only for description, and should not be understood as indicating or implying to have importance in relativity.

Finally, it should be indicated that the above embodiments are merely specific implementations intended to explain the technical solutions of the present invention and are not intended to limit the present invention, and the scope of protection of the present invention is not limited thereto. Although the present invention has been explained in detail with reference to the foregoing embodiments, it would be understood by those skilled in the art that, the technical solutions described in the foregoing embodiments can still be modified or readily varied, or some of the technical features thereof can be substituted by equivalent alternatives, in the technical scope disclosed in the present invention, and such modifications, variations or substitutions do not make the essence of the corresponding technical solutions depart from the spirit and the scope of the technical solutions of the embodiments of the present invention, and shall all be covered in the scope of protection of the present invention. Therefore, the scope of protection of the present invention shall be defined by the claims.

The invention claimed is:

1. A data indexing method, comprising steps of:
creating, in order of field values of preset fields within a plurality of data records corresponding to a data file, a clustered index for the data file, with the data records having different positional offsets in the data file;
plotting, for the plurality of data records in the data file, distribution of the positional offsets corresponding to the field values; and
performing curve-fitting on the distribution of the positional offsets corresponding to the respective field values, to obtain a fitting function, so as to determine a positional offset according to field value(s) of preset field(s) in a data record to be queried, and then acquire the data record according to the determined positional offset, wherein the step of performing curve-fitting comprises steps of:

performing curve-fitting on the distribution of positional offsets corresponding to a plurality of field values to obtain a fitting function;

calculating a positional offset for each data record by the fitting function;

determining that the fitting function satisfies a preset condition when deviation values are all smaller than a preset threshold, with each deviation value between an actual positional offset and a calculated positional offset corresponding to one of the plurality of data records, and keeping the fitting function;

determining respective actual positional offsets and field values corresponding to the actual positional offsets if the fitting function fails to satisfy the preset condition;

judging, in the individual determined field values, whether there is a situation that a difference value between any two adjacent field values is greater than a preset jump threshold; and inserting a blank record in the data file, if there is the situation that a difference value between any two adjacent field values is greater than a preset threshold, with the blank record between the two adjacent field values which have a difference value greater than the preset threshold, so that the actual positional offset corresponding to the larger field value in the two adjacent field values varies, and further so that the positional offsets corresponding to respective field values and the inserted blank record are subjected to fitting, to obtain a fitting function, with the fitting function satisfying the preset condition.

2. The data indexing method according to claim 1, wherein the step of performing curve-fitting on distribution of the positional offsets corresponding to the respective field values to obtain a fitting function further comprises steps of:

dividing the plurality of field values into two sets of field values if the fitting function fails to satisfy the preset condition;

performing curve-fitting, respectively for the two sets of field values, distribution of the positional offsets corresponding to the plurality of field values to obtain fitting functions;

performing a further division, when only one fitting function satisfying the preset condition, on a plurality of field values in the set of field values corresponding to the fitting function that fails to satisfy the preset condition into two sets of field values;

performing curve-fitting on combined set of adjacent sets of field values to obtain a fitting function, with one being a set of field values of a fitting function that satisfies the preset condition in the sets of the field values obtained by the further division and the other being the set of field values corresponding to any fitting function satisfying the preset condition; and calculating a positional offset for each data record according to the fitting function, until the obtained fitting function satisfies the preset condition.

3. The data indexing method according to claim 2, wherein the step of performing curve-fitting on distribution of the positional offsets corresponding to the respective field values to obtain a fitting function further comprises steps of:

selecting several field values from the respective remaining field values, in case that there remain multiple field values in the set of field values corresponding to the fitting function that fails to satisfy the preset condition and the fitting function obtained, by performing curve-fitting on the remaining field values and the set of field values corresponding to the fitting function that satisfies the preset condition, fails to satisfy the preset condition, wherein the selected several field values and respective positional offsets corresponding to the field value gradually increase monotonously, and a difference value between any two adjacent positional offsets is a preset threshold; and establishing an index for the selected respective field values and the positional offsets corresponding to the selected field values respectively by an original indexing method.

4. The data indexing method according to claim 1, wherein the step of performing curve-fitting on distribution of the positional offsets corresponding to the respective field values to obtain a fitting function further comprises steps of:

determining, if the fitting function fails to satisfy the preset condition, a data record in which a deviation value between an actual positional offset and a calculated positional offset is greater than the preset threshold; and establishing, for the data record, at the calculated positional offset, a jumping record indicating a jump to the actual positional offset, so that data record at the actual positional offset is able to be queried according to the jumping record.

5. The data indexing method according to claim 1, wherein the step of performing curve-fitting on distribution of the positional offsets corresponding to the respective field values to obtain a fitting function further comprises steps of:

determining, if the fitting function fails to satisfy the preset condition, a plurality of data records each having a deviation value between an actual positional offset and a calculated positional offset greater than the preset threshold; and establishing a jump table including correspondences between the field values and the actual positional offsets of the plurality of data records, so that the data record at the actual positional offset is able to be queried according to the jumping table.

6. The data indexing method according to claim 1, wherein the step of performing curve-fitting on distribution of the positional offsets corresponding to the respective field values to obtain a fitting function further comprises steps of:

selecting a first preset number of field values from a plurality of field values and performing curve-fitting to obtain a fitting function, wherein every two adjacent field values are spaced by a second preset number of field values.

7. A data indexing apparatus, comprising a creation module, a plotting module and a fitting module, wherein the creation module is configured to create, in order of field values of preset fields within a plurality of data records corresponding to a data file, a clustered index for the data file, with the data records having a different positional offsets in the data file;

the plotting module is configured to plot, for the plurality of data records in the data file, distribution of positional offsets corresponding to the field values; and the fitting module is configured to perform curve-fitting on distribution of the positional offsets corresponding to the respective field values to obtain a fitting function, so as to determine a positional offset according to field value(s) of preset field(s) in a data record to be queried, and then acquire the data record according to the determined positional offset wherein the curve-fitting comprises:

performing curve-fitting on the distribution of positional offsets corresponding to a plurality of field values to obtain a fitting function;

calculating a positional offset for each data record by the fitting function;

determining that the fitting function satisfies a preset condition when deviation values are all smaller than a preset threshold, with each deviation value between an actual positional offset and a calculated positional offset corresponding to one of the plurality of data records, and keeping the fitting function;

determining respective actual positional offsets and field values corresponding to the actual positional offsets if the fitting function fails to satisfy the preset condition;

judging, in the individual determined field values, whether there is a situation that a difference value between any two adjacent field values is greater than a preset jump threshold; and inserting a blank record in the data file, if there is the situation that a difference value between any two adjacent field values is greater than a preset threshold, with the blank record between the two adjacent field values which have a difference value greater than the preset threshold, so that the actual positional offset corresponding to the larger field value in the two adjacent field values varies, and further so that the positional offsets corresponding to respective field values and the inserted blank record are subjected to fitting, to obtain a fitting function, with the fitting function satisfying the preset condition.

* * * * *